Oct. 27, 1953   J. M. HOBSON   2,657,370
CABLE TERMINAL
Filed June 6, 1950

INVENTOR.
Judson M. Hobson
BY Stedman B Hoar
Agent

Patented Oct. 27, 1953

2,657,370

UNITED STATES PATENT OFFICE 2,657,370

CABLE TERMINAL

Judson M. Hobson, Garden Grove, Calif.

Application June 6, 1950, Serial No. 166,355

3 Claims. (Cl. 339—202)

1

This invention relates to devices for connecting electric cables to electro-conductive rigid members, and pertains more specifically to devices for connecting cables to electric battery posts.

It is an object of this invention to provide a cable-terminal which will hold the wires of a cable in a firm electro-conductive grip without the use of solder and which thereby may be removed from a broken cable and placed on a new or shortened cable without injury or difficulty.

A further object of the invention is to provide a cable terminal which may be secured to a battery post so as to be easily detachable therefrom, the post-gripping mechanism being adapted to release the post immediately when released from pressure, and the pressure-applying mechanism operating at sufficient distance from the post to be relatively insusceptible to electrolytic action.

Still another object of the invention is to provide a cable terminal of simple and rugged construction, having few parts and low cost of manufacture.

A more detailed object is to provide a cable terminal in which a gib or plug, placed under pressure, grips and makes electric contact with the cable wires and the battery post, and when released from pressure releases both the wires and the post.

Other objects and useful advantages of the invention will be pointed out as the following description of a preferred embodiment of the invention proceeds, or will be apparent from that description considered with the accompanying drawing, in which.

Figure 1:
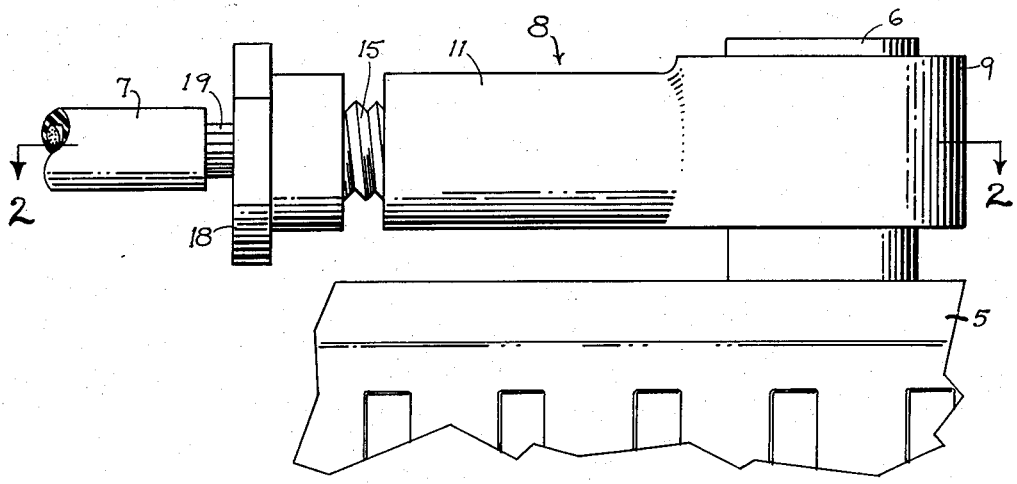
Fig. 1 is a side elevational view of a cable terminal according to my invention.

Having reference now to the details of the drawing, I have shown a conventional battery 5, having a battery post 6 to which a cable 7 is to be connected. The cable terminal body, generally indicated at 8, comprises a ring member or collar 9 with a central opening 10 of slightly greater diameter than the post 6, permitting the collar to loosely encompass the post and to be easily placed thereon and removed therefrom. A shank 11 extends from one side of the collar 9 and has a longitudinal bore 12 opening through the wall of the collar into the opening 10 and provided with threads 13 at its outer end.

A threaded sleeve 15 is adapted to be screwed into the bore 12, engaging the threads 13 and has

2 an unthreaded end portion 16 slidable in the unthreaded portion 17 of the bore 12. The sleeve 15 may have an angulated head 18 for receiving a wrench, or other suitable means for rotating it. The bore 19 of the sleeve 15 is adapted to receive the bare wires 20 of the cable 7 from which the customary insulation has been stripped. At the inner end of the sleeve 15, the bore 19 is preferably flared outwardly to form a conical recess 21.

A plug or gib 23 is mounted slidingly in the bore 12, and has a conical end 24 sloped to be substantially symmetrical with the chamfer of the recess 21. The other end of the gib 23 preferably has a transverse shallow groove 25 conforming in curvature to the periphery of the post 6.

Figure 2:
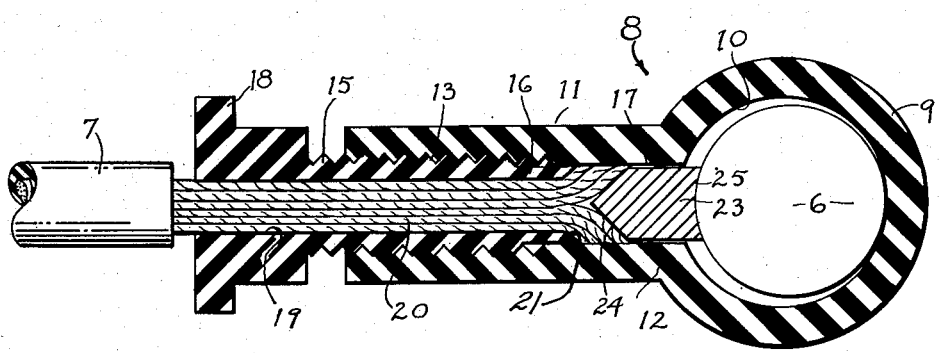
Fig. 2 is a longitudinal sectional view on the plane of section indicated by the line 2—2 of Fig. 1.
Figure 3:
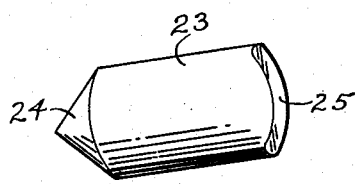
Fig. 3 is a perspective view of the aforesaid gib.

The method of connecting a cable 7 to a battery post 6 by means of my improved cable terminal 8, will be obvious from consideration of Fig. 2. The stripped wires 20 are inserted through the sleeve 15 until their ends protrude through and beyond the conical recess 21. The collar 9 is placed over the post 6, with the gib 23 floating in the bore 12 and oriented so that the shallow groove 25 is adjacent to the post 6 and axially aligned with the axis of the post. The sleeve 15 is inserted in the bore 12 and screwed therein to force the ends of the wires 20 against the conical point 24 of the gib 23. The pressure thus exerted on the gib 23 clamps the post 6 between the gib and the opposite wall of the opening 10, and spreads the wires so that they are clamped between the point 24 and the chamfered wall of the recess 21. A firm electrical and mechanical contact is thus established between the wires 20 and the post 6 through the medium of the gib 23 which is under pressure at both ends.

To detach the terminal 8 from the post, the sleeve 15 is threadedly retracted in the threads 13 to relieve pressure upon the gib 23. As, unlike the bolt threads in the ordinary split-collar type of terminal, the threads 13 are sealed within the bore 12 by the pressure of the wire ends against the wall of the bore and the only exposed portion of the threads is at a relatively great distance from the post, the threads are not likely to be frozen by electrolytic action or by products of corrosion, and the sleeve 15 may be easily retracted. The gib 23 may then be easily knocked or twisted loose from its contact with the post 6, and the latter may be withdrawn from the over-size opening 10. The flared ends of the wires 20 will ordinarily prevent the cable from being pulled out of the sleeve 15 during this operation. While I have shown the bore 12 as being radial to the opening 10 and the gib 23 therefore applying radial pressure to the post 7, it should be understood that this construction is preferred only for the purpose of facilitating separation of the terminal from the post, and that the gib may also press obliquely on the post where an extremely tight or permanent connection is desired.

It will now be apparent that since the gib 23 makes a positive electrical connection between the wires 20 and the post 6, all other parts of the terminal 8 may be made of non-corroding, non-conductive material. The collar 9, with its laterally extending shank 11, and the sleeve 15, may be formed of plastic material, thereby not only reducing electrolysis and corrosion but reducing the danger of accidental short-circuiting and sparking at the terminal.

A further advantage of a plastic sleeve is that it will ordinarily be soft relatively to the wires of the cable and therefore may score slightly and help twist the wires upon the gib. The gib obviously must be of a conductive metal, and hard enough to maintain a point which will penetrate the bundle of wires and spread the wires upon its surface.

If it is desired to remove the sleeve 15 from one cable 7 and to install it on another or upon freshly stripped wires of the cable upon which it has been, the wire ends may be easily straightened when the sleeve has been removed from the bore 12.

As my invention is subject to some modification by those skilled in the art without departure from its proper spirit, I wish to have the scope of the invention considered not as limited to the particular embodiment herein described and illustrated, but rather as coextensive with the appended claims.

I claim:

1. In an electrical cable terminal: a collar having a wall adapted to loosely encompass a terminal post; a lateral extension on said collar having a bore opening through said wall; a sleeve mounted in said bore and having a conically flaring inner end; threaded means interacting between said extension and said sleeve for advancing said sleeve rotatively towards said collar; and a gib carried slidably within said bore beyond said sleeve so as to extend through said wall to engage said post, and having a conical end adapted to wedge the ends of wires threaded through said sleeve against the conical end of said sleeve, said gib having a surface arranged to interlock with said post to prevent rotation of said gib when said gib is pressed against said post.

2. In an electrical cable terminal: the construction set forth in claim 1, in which the end of said gib engageable with said post has a transverse shallow groove conforming to the periphery of said post.

3. In an electrical cable terminal: the construction set forth in claim 1, in which said gib is electro-conductive, and said collar, said extension, and said sleeve are non-conductive, said sleeve being of material softer than said gib.

JUDSON M. HOBSON.

References Cited in the file of this patent

UNITED STATES PATENTS

| Number | Name | Date |
| --- | --- | --- |
| 982,563 | Baird | Jan. 24, 1911 |
| 1,856,018 | Barth | Apr. 26, 1932 |
| 2,357,567 | Williams | Sept. 5, 1944 |

FOREIGN PATENTS

| Number | Country | Date |
| --- | --- | --- |
| 281,755 | England | Dec. 5, 1927 |